(12) United States Patent
Eom et al.

(10) Patent No.: US 9,297,636 B2
(45) Date of Patent: Mar. 29, 2016

(54) VARIABLE RELUCTANCE RESOLVER

(75) Inventors: Hong-chan Eom, Incheon (KR);
Yeong-sik Kim, Bucheon-si (KR);
In-sub Shin, Daejeon (KR); Gyu-ryong Choi, Ansan-si (KR)

(73) Assignee: Daesung Electric Co., Ltd., Ansan-si (KR)

( * ) Notice: Subject to any disclaimer, the term of this patent is extended or adjusted under 35 U.S.C. 154(b) by 701 days.

(21) Appl. No.: 13/697,762

(22) PCT Filed: Sep. 7, 2010

(86) PCT No.: PCT/KR2010/006061
§ 371 (c)(1),
(2), (4) Date: Jan. 23, 2013

(87) PCT Pub. No.: WO2011/145778
PCT Pub. Date: Nov. 24, 2011

(65) Prior Publication Data
US 2013/0127451 A1    May 23, 2013

(30) Foreign Application Priority Data
May 20, 2010  (KR) .................. 10-2010-0047200

(51) Int. Cl.
*G01B 7/30* (2006.01)
*G01D 5/20* (2006.01)

(52) U.S. Cl.
CPC ............... *G01B 7/30* (2013.01); *G01D 5/2046* (2013.01)

(58) Field of Classification Search
CPC ... G01D 5/2046; G01D 5/2013; H02K 24/00; H02K 3/522; H02K 11/0031; G01B 7/30

USPC .......................... 324/207.16, 207.17, 207.25
See application file for complete search history.

(56) References Cited

U.S. PATENT DOCUMENTS

2010/0123426 A1 *  5/2010  Nashiki et al. ................ 318/701

FOREIGN PATENT DOCUMENTS

JP    S49124508      11/1974
JP    57070406 A     4/1982
JP    01218344 A     8/1989

(Continued)

OTHER PUBLICATIONS

Daesung Electric Co., Ltd., Variable Reluctance Resolver, Patent Cooperation Treaty Application Serial No. PCT/KR2010/006061, filed Sep. 7, 2010, International Search Report and Written Opinion, dated Apr. 28, 2011.

*Primary Examiner* — Daniel Miller
(74) *Attorney, Agent, or Firm* — Schmeiser, Olsen & Watts LLP

(57) ABSTRACT

The present invention relates to a resolver of an electric driving motor for vehicle which comprises a rotor, a stator comprising a stator main body which encircles the rotor and teeth which extend from the stator main body to be wound by a coil, a terminal module comprising a terminal end which contacts the coil for an electric connection and a terminal main body which supports the terminal end, and a connector module comprising a connector main body which is detachably coupled to the terminal main body and a lead line which is connected to an outer device and supported by the connector main body and which contacts the terminal end for an electric connection if the connector main body is coupled to the terminal main body, thus simplifying manufacturing process and repairing process and reducing cost.

5 Claims, 5 Drawing Sheets

(56) References Cited

FOREIGN PATENT DOCUMENTS

| | | |
|---|---|---|
| JP | 05022914 | 1/1993 |
| JP | 06303732 | 10/1994 |
| JP | 08178610 A | 7/1996 |
| JP | 08178611 A | 7/1996 |
| JP | 2000236638 A | 8/2000 |
| JP | 2003250254 A | 9/2003 |
| JP | 2004151040 | 5/2004 |
| JP | 2006187131 | 7/2006 |
| KR | 1019960035791 | 10/2003 |

* cited by examiner

VARIABLE RELUCTANCE RESOLVER

TECHNICAL FIELD

The present invention relates to a variable reluctance resolver comprising an outer stator which has a field winding and an output winding and an inner rotator which has protrusions.

BACKGROUND ART

A resolver is a kind of a sensor for precisely measuring rotation speed and angle of a motor. Especially, a variable reluctance type resolver which includes the present invention has a relatively simple structure where both field winding and output winding are located at a stator and where a rotator having a shape of an ellipse or multiple poles is located within the stator.

Such a structure of the variable reluctance resolver has been introduced in Japanese Patent Application Publication H8-178610 "VARIABLE RELUCTANCE TYPE ANGLE DETECTOR" (Publication date: Jul. 12, 1996) and etc.

FIG. 1 is a drawing attached in the above Japanese Patent Application Publication. A rotor 10 is formed with four protrusion portions 10a, and a slot 11a of a stator 11 receives the field winding and the output winding. An alternating voltage induced by the rotator 10 is output while changing due to the protrusion portions 10a.

FIG. 2 shows a rotator 20 of an improved shape. Eight elliptical protrusion portions 20a are formed on an outer peripheral surface with a predetermined interval of 45 degrees in the circular direction.

According to an experiment, if an exciting input voltage was 2.5 [Vrms] and 10 [kHz] with the rotator 20 having its shape as shown in FIG. 2, the corresponding output voltage 1, 2 was 2.96 [Vpkpk] (refer to FIG. 3).

However, the rotator 20 showing such a low output voltage and the resolver adopting the rotator have been required to have a structural improvement for an enhance in performance or in the same vein a cost cutting under the same condition of the output voltage.

DISCLOSURE

Technical Problem

Therefore, it is an object of the present invention to provide a variable reluctance resolver which secures enhanced performance and high reliability through an improvement of a shape and which enables an improved productivity in consideration of the cost cutting.

Technical Solution

In order to accomplish the above object, the present invention provides a variable reluctance resolver comprising a stator which receives a field winding and an output winding in a plurality of slots formed in an annular inner peripheral surface and a rotor which is disposed to have a predetermined clearance from the inner peripheral surface of the stator, wherein the rotor is alternately formed with sawtooth-shaped protrusion portions and flat surfaces on an outer peripheral surface thereof, and length of the protrusion portions in a circumferential direction is longer than that of the flat surfaces in the circumferential direction.

According to an aspect of the present invention, the protrusion portions have inclined surfaces between the flat surfaces, the inclined surfaces are set to have an angle of more than 90 degrees and equal to or less than 145 degrees with respect to the flat surfaces.

According to an aspect of the present invention, the inclined surfaces are set to have an angle of 113 degrees.

According to an aspect of the present invention, eight protrusion portions and eight flat surfaces are alternately formed in the circumferential direction of the rotor.

According to an aspect of the present invention, a circular surface of the protrusion portion has a central angle of 29 degrees and the flat surface has the central angle of 15 degrees.

In order to accomplish the above object, the present invention also provides a variable reluctance resolver comprising a stator which receives a field winding and an output winding in a plurality of slots formed in an annular inner peripheral surface and a rotor which is disposed to have a predetermined clearance from the inner peripheral surface of the stator, wherein the rotor is alternately formed with trapezoidal protrusion portions and flat surfaces on an outer peripheral surface thereof, and length of the protrusion portions in a circumferential direction is longer than that of the flat surfaces in the circumferential direction.

Advantageous Effects

According to the variable reluctance resolver of the present invention as described above, tooth-shaped protrusion portions and flat surfaces are alternately formed on the outer peripheral surface of a rotor, wherein the length of the protrusion portion in the circumferential direction is longer than that of the flat surface, so that output voltage compared to the input voltage can be much increased by changing only a shape of the rotor under the condition of the same structure and winding turns of the stator.

Also, if the same output voltage is required compared to the conventional art, the winding turns of the stator and the number of laminated steel plates as well can be much decreased for such an increase of the output voltage.

BEST MODE

Figure 4:
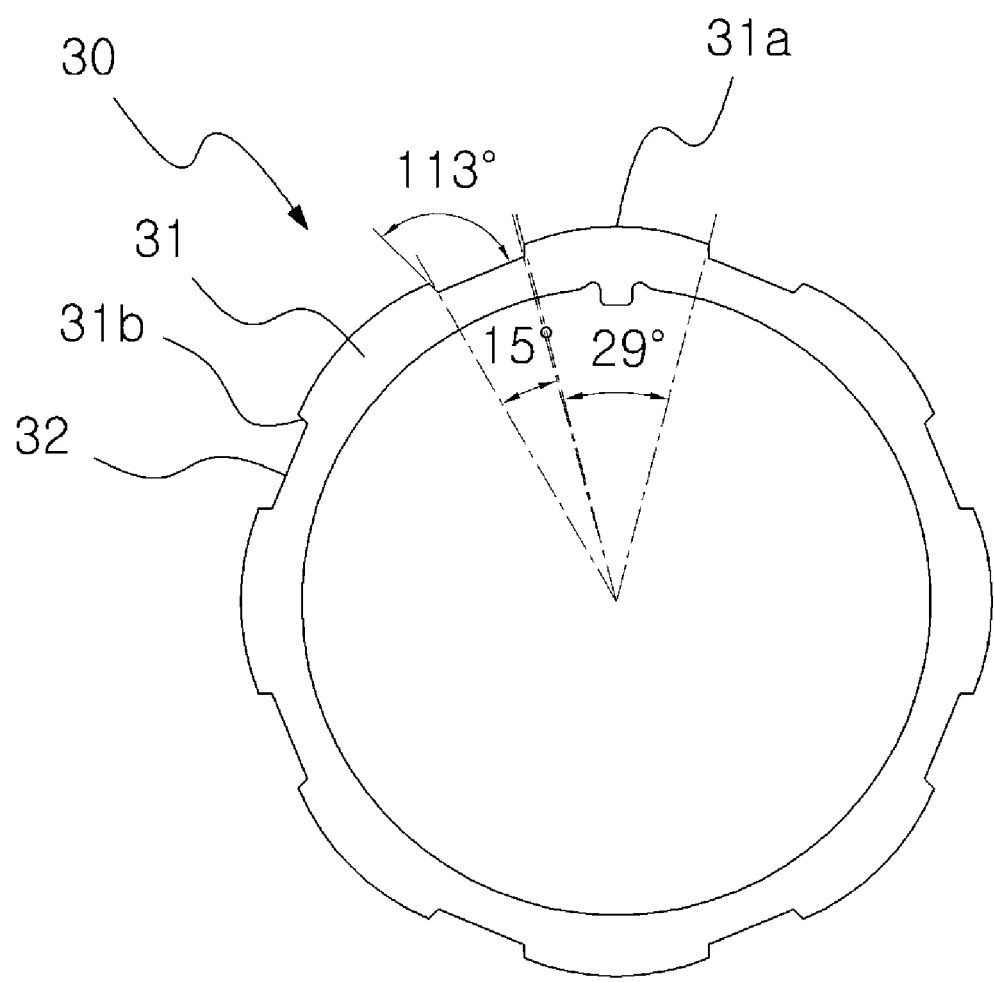
FIG. 4 is a plan view of a rotor of a variable reluctance resolver according to an exemplary embodiment of the present invention.

A variable reluctance resolver according to an exemplary embodiment of the present invention includes a structure of an annular rotor 30 as shown in FIG. 4.

The rotor 30 is alternately formed on its outer peripheral surface with sawtooth-shaped protrusion portions 31 and flat surfaces 32 which are formed depressed relative to the protrusion portions 31.

In this embodiment, the rotor 30 is provided with eight protrusion portions 31 and eight flat surfaces 32 which are alternately formed in a circumferential direction of the rotor 30.

Also, length of the outer peripheral surface of the protrusion portions 31 in the circumferential direction is form to be longer than that of the flat surfaces 32.

Specifically, a circular surface which is formed by the outer peripheral surface 31a of one protrusion portion 31 has a central angle of 29 degrees, and one flat surface 32 has the central angle of 15 degrees.

Also, in this embodiment, the protrusion portion 31 has inclined surfaces 31b between the flat surfaces 32 thus having a shape of a trapezoid as a whole.

In this case, the inclined surface 31b is set to be inclined with an angle of more than 90 degrees and equal to or less than 145 degrees with respect to the flat surface 32.

In this embodiment, the inclined surface 31b is set to be inclined with an angle of 113 degrees with respect to the flat surface 32.

Figure 1:
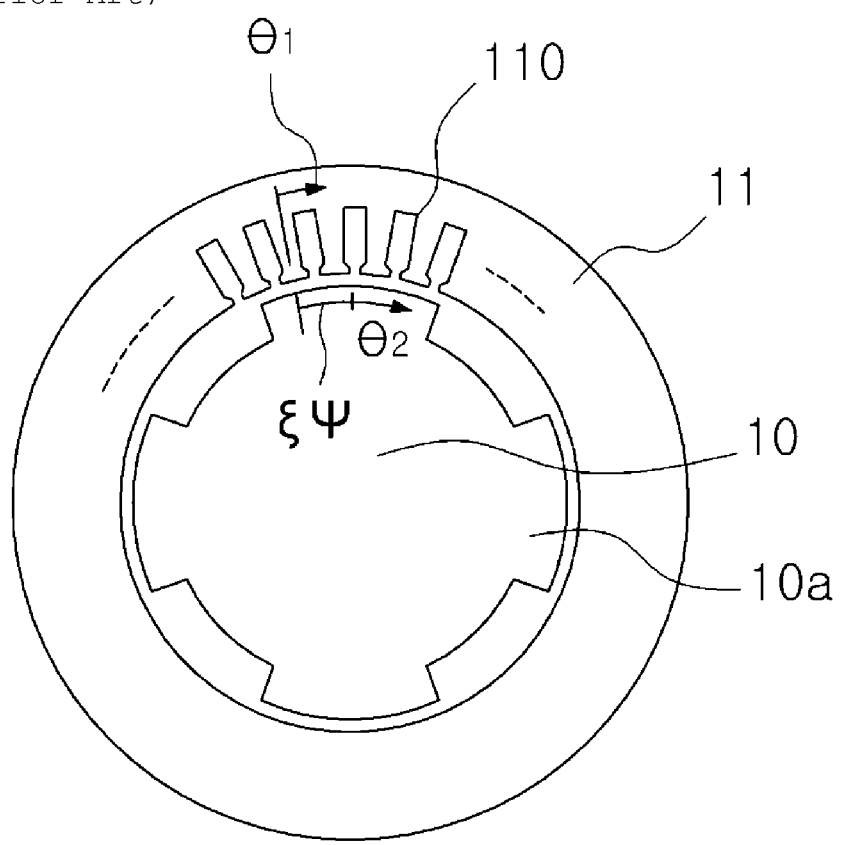
FIG. 1 is a schematic view of a conventional variable reluctance resolver.
Figure 2:
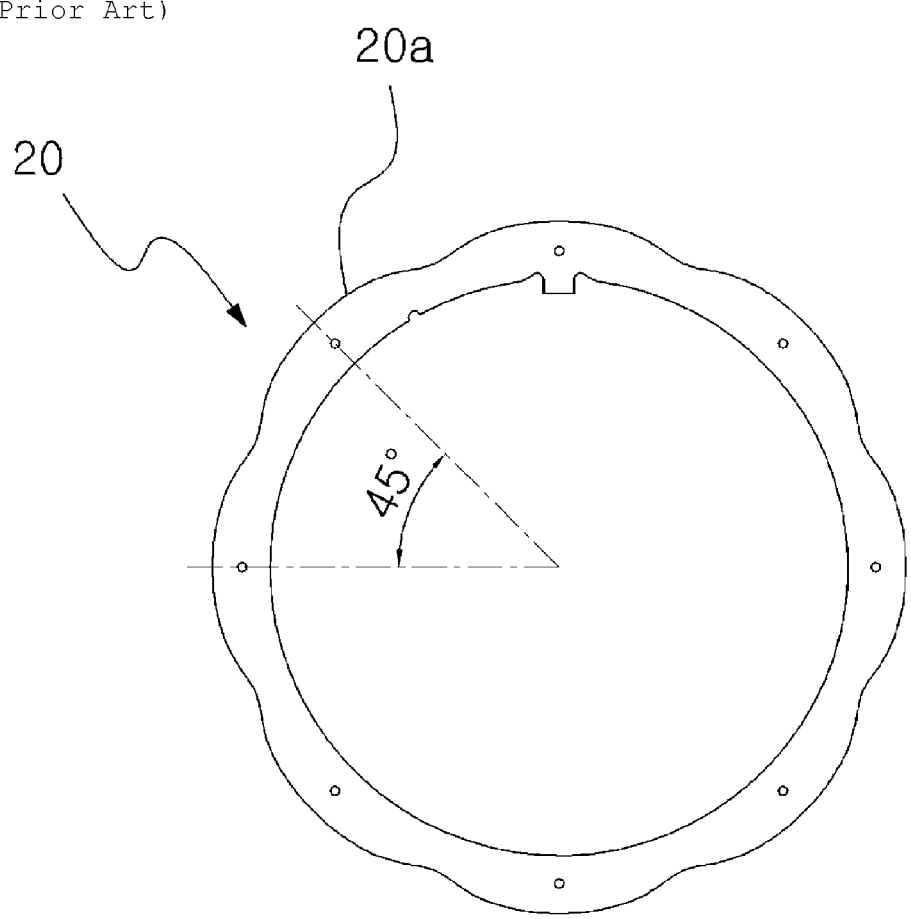
FIG. 2 is a plan view of another example of a rotor which can be adopted in the variable reluctance resolver of FIG. 1.
Figure 3:
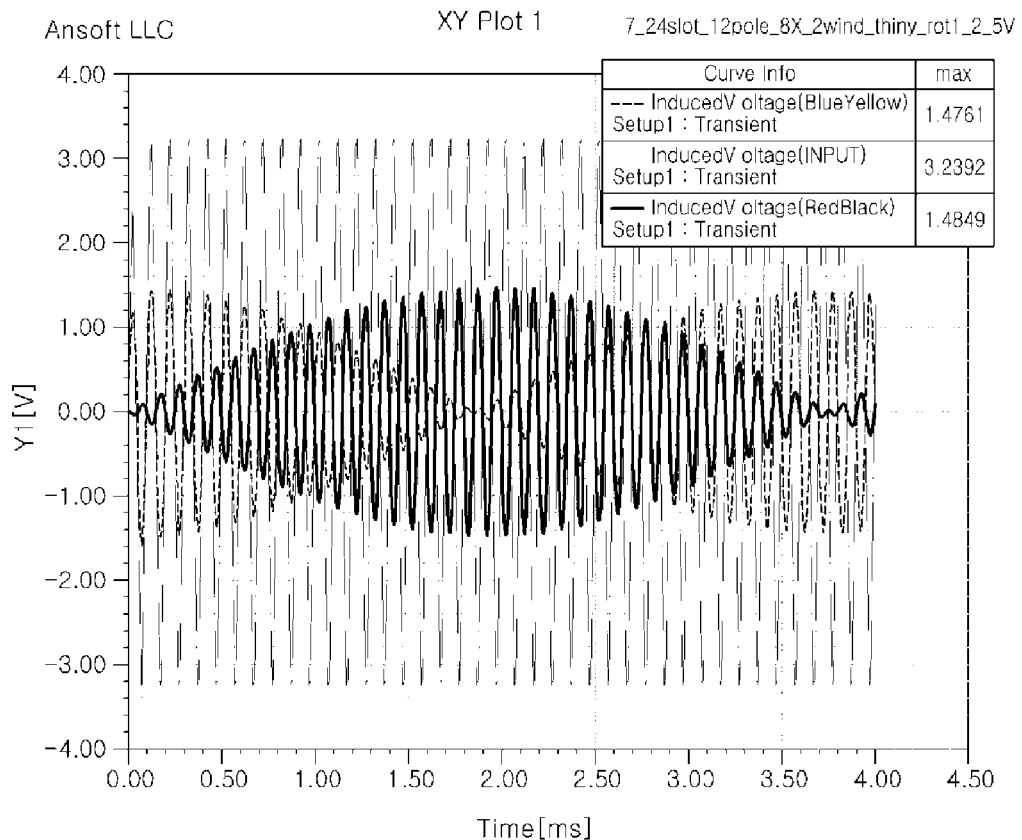
FIG. 3 is a graph displaying performance according to the rotor of FIG. 2.
Figure 5:
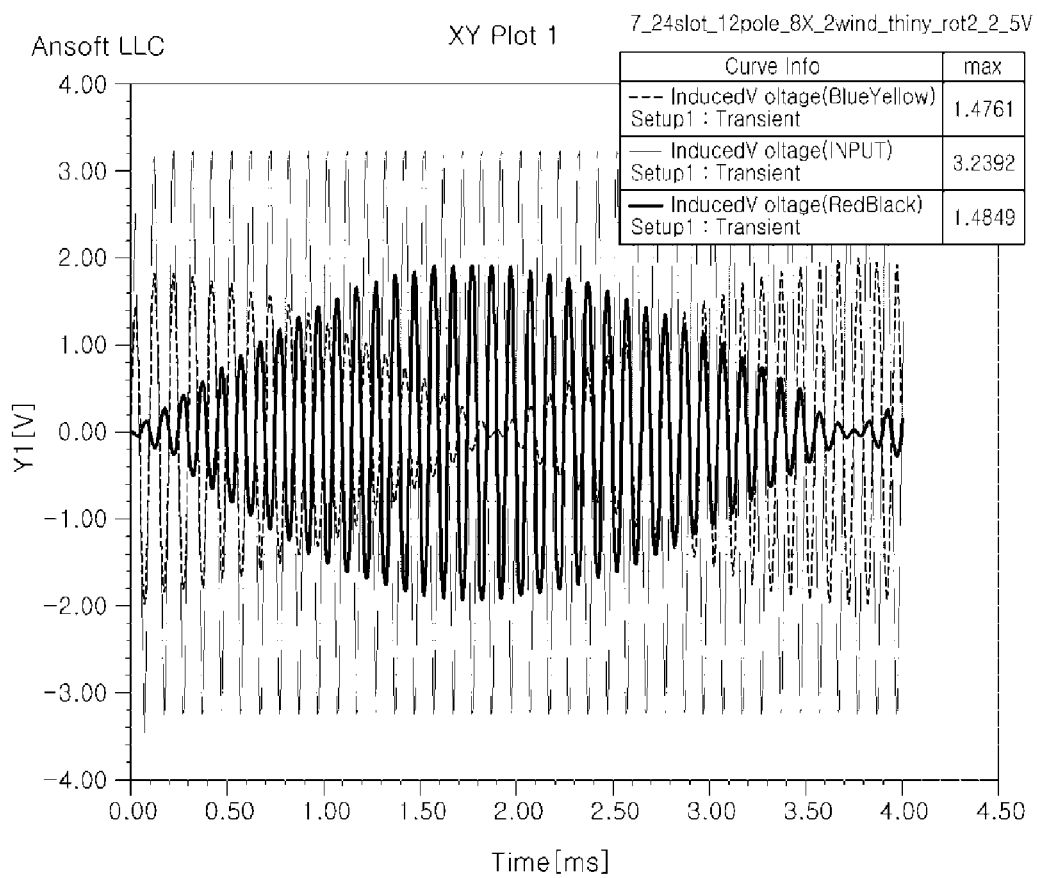
FIG. 5 is a graph displaying performance according to the rotor of FIG. 4.

According to an experiment with the rotor 30 having its shape as described above, the output voltage 1, 2 was shown to be 4.0 [Vpkpk] (refer to FIG. 5) when the experiment was performed with the exciting input voltage of 2.5 [Vrms] and 10 [kHz] that is the same condition as in the conventional rotor (20 refer to FIG. 2).

That is, if other conditions are set to be the same, the experiment indicates that an improvement of 4.0/2.96=1.35, that is 35[%], in the voltage transformation ratio can be accomplished through a modification of the shape of the rotor.

Therefore, as the voltage transformation ratio according to the exemplary embodiment of the present invention is improved compared to that in the conventional art, the winding turns of the stator and the number of laminated steel plates can be decreased under the same condition of the output voltage.

The rotor 30 and the variable reluctance resolver comprising the rotor 30 as described above are only to help understand the present invention and are not to be understood as limiting the scope of patent right or the technological scope of the present invention.

The scope of patent right or the technological scope of the present invention is defined by the appended claims and their equivalents.

The invention claimed is:

1. A variable reluctance resolver comprising a stator which receives a field winding and an output winding in a plurality of slots formed in an annular inner peripheral surface and a rotor which is disposed to have a predetermined clearance from the inner peripheral surface of the stator, wherein
the rotor is alternately formed with sawtooth-shaped protrusion portions and flat surfaces on an outer peripheral surface thereof, and a length of the protrusion portions in a circumferential direction is longer than that of the flat surfaces in the circumferential direction, wherein eight protrusion portions and eight flat surfaces are alternately formed in the circumferential direction of the rotor and wherein a circular surface of each protrusion portion has a central angle of 29 degrees and each flat surface has a central angle of 15 degrees.

2. The variable reluctance resolver according to claim 1, wherein the protrusion portions have inclined surfaces between the flat surfaces, the inclined surfaces are set to have an angle of more than 90 degrees and equal to or less than 145 degrees with respect to the flat surfaces.

3. The variable reluctance resolver according to claim 2, wherein the inclined surfaces are set to have an angle of 113 degrees.

4. A variable reluctance resolver comprising a stator which receives a field winding and an output winding in a plurality of slots formed in an annular inner peripheral surface and a rotor which is disposed to have a predetermined clearance from the inner peripheral surface of the stator, wherein
the rotor is alternately formed with trapezoidal protrusion portions and flat surfaces on an outer peripheral surface thereof, and a length of the protrusion portions in a circumferential direction is longer than that of the flat surfaces in the circumferential direction, wherein a circular surface of each protrusion portion has a central angle of 29 degrees and each flat surface has a central angle of 15 degrees.

5. A rotor of a variable reluctance resolver, disposed to have a predetermined clearance from an annular inner peripheral surface of a stator, wherein
the rotor is alternately formed with sawtooth-shaped protrusion portions and flat surfaces on an outer peripheral surface thereof, and a length of the protrusion portions in a circumferential direction is longer than that of the flat surfaces in the circumferential direction, wherein a circular surface of each protrusion portion has a central angle of 29 degrees and each flat surface has a central angle of 15 degrees.

* * * * *